Dec. 19, 1967

G. G. INGHAM 3,358,318

DOOR CHECK

Filed March 5, 1965

INVENTOR.
GARY G. INGHAM
BY
Mildred K. Flowers
AGENT

United States Patent Office 3,358,318
Patented Dec. 19, 1967

---

3,358,318
DOOR CHECK
Gary G. Ingham, Oklahoma City, Okla., assignor to Roto-Swing Door Co., Inc., Oklahoma City, Okla., a corporation of Oklahoma
Filed Mar. 5, 1965, Ser. No. 437,390
5 Claims. (Cl. 16—82)

ABSTRACT OF THE DISCLOSURE

A dampening device utilizing a spring urged valving mechanism in combination with a piston member for eliminating a ball and seat arrangement. The piston member is preferably constructed from an acetal resin, and disposed within an aluminum housing, and utilized in combination with a hydraulic fluid which is a silicone fluid.

---

This invention relates to improvements in dampening devices and more particularly, but not by way of limitation, to a hydraulic checking device for controlling the closing speed of a door, or the like.

There are many types of hinged doors available today adapted to be opened upon manual pressure against one side thereof and closed upon a release of the pressure thereagainst. These doors are frequently actuated by means of a spring means whereby the spring is compressed during opening of the door. Release of the opening pressure permits the spring to expand for closing of the door. Whereas it is usually desirable to provide for a substantially free swinging action for the door during opening thereof, it is preferable to control or dampen the closing of the door against a person moving through the open doorway. Many types of checking or dampening devices are in use for controlling the closing speed of this type of door, and one of the most common types of dampening device is the hydraulic control device. Most of the hydraulic control or checking devices utilize a ball and seat check arrangement for controlling the circulation or flow of the hydraulic fluid through a passageway. In actual practice, however, these ball check devices have certain disadvantages in that often the ball will not seat properly against the seating portion, which results in a leakage of fluid therearound and reduces the efficiency of the control of the flow of the hydraulic fluid.

The present invention contemplates a novel dampening or checking device particularly designed and constructed for eliminating a ball and seat arrangement to provide a more efficient control of the fluid flow in a hydraulic dampening system. The novel checking device includes a piston member having a spring urged valving mechanism in association therewith whereby an efficient control of the fluid flow may be maintained during reciprocation of the piston. In addition, it has been found that excellent results are obtained when utilizing a piston constructed from an acetal resin, such as that known by the trade name Delrin, within an aluminum housing, and with the hydraulic fluid being a silicone fluid. This combination of materials has been found to substantially eliminate wear of the piston or the inner periphery of the fluid chamber. This is apparently due to the fact that the silicone fluid has a minimum dimension, and as a result it is possible to provide a very small clearance between the outer periphery of the piston and the inner periphery of the chamber without leakage of the silicone fluid therebetween. Furthermore, this combination of materials has been found to provide a substantially frictionless movement for the piston, which greatly increases the overall efficiency of operation for the dampening device.

It is an important object of this invention to provide a novel check device particularly designed and constructed for assuring an efficient control of fluid flow in a hydraulic dampening system.

Another object of this invention is to provide a novel dampening device for controlling the closing speed of a door, or the like, wherein the valving mechanism thereof is arranged for assuring an efficient closing during operation of the device for braking or dampening the closing speed of the door.

Still another object of this invention is to provide a novel dampening device in combination with a hydraulic fluid and housing wherein friction between the dampening device and housing is substantially eliminated during operation of the device.

A further object of this invention is to provide a novel check device which is simple and efficient in operation and economical and durable in construction.

Other and further objects and advantages features of the present invention will hereinafter more fully appear in connection with a detailed description of the drawings in which.

Figure 1:
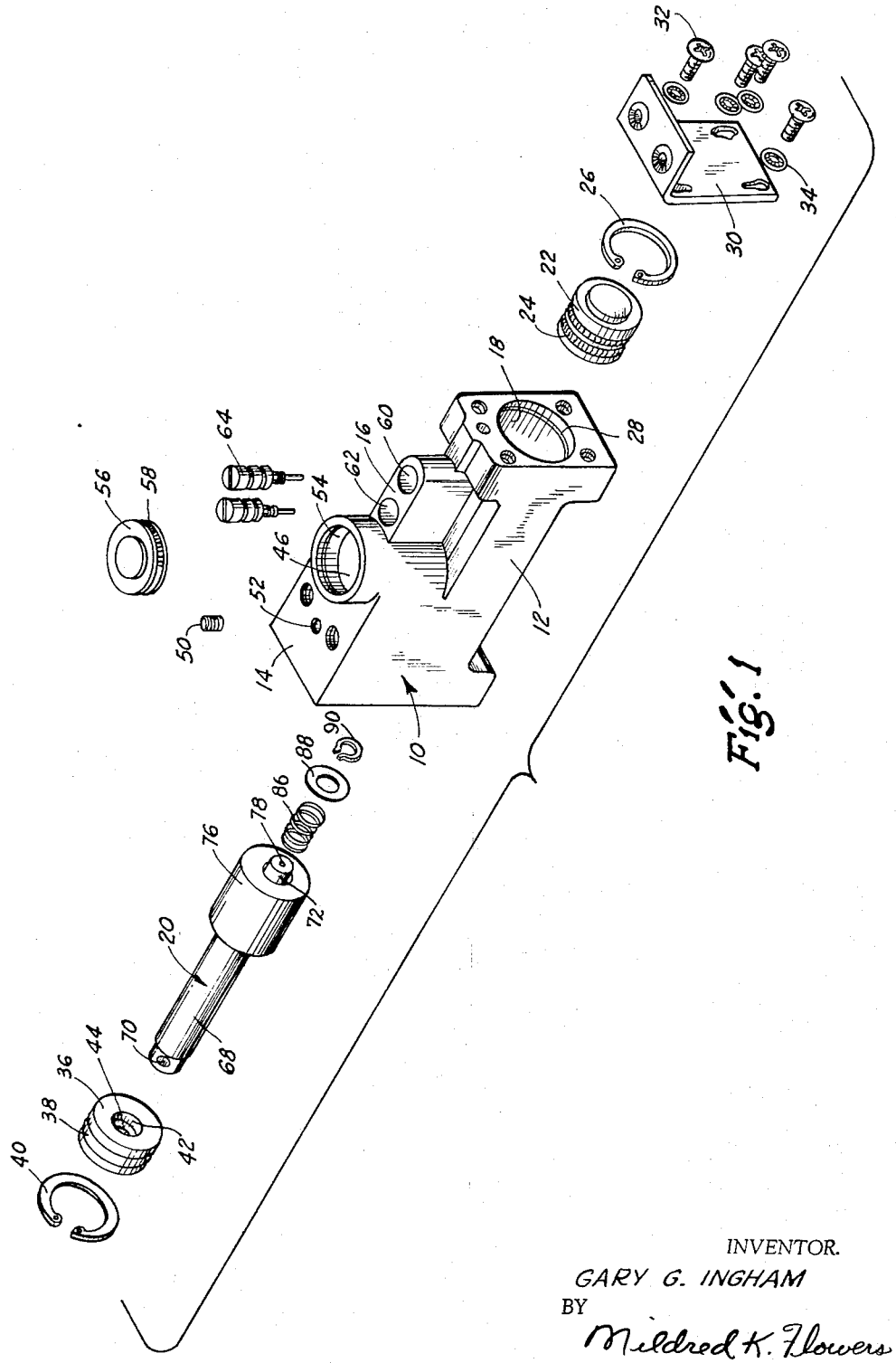
FIGURE 1 is an exploded perspective view of a dampening device embodying the invention.

Referring to the drawings in detail, reference character 10 generally indicates a housing structure comprising a main body portion 12 and an enlarged portion 14 having an off-set portion 16 interconnected therebetween. A bore 18 extends longitudinally through the main body portion 12 for receiving a slidable or reciprocal piston 20 therein as will be hereinafter set forth in detail. One end of the bore 18 is closed by a suitable plug member 22 having a plurality of sealing rings 24 provided on the outer periphery thereof for precluding leakage of fluid therearound. The plug 22 may be secured within the bore 18 in any well known manner, such as by a lock ring 26 adapted to engage an annular recess 28 provided in the bore 18 as clearly shown in FIGURE 1. An end plate or mounting bracket 30 may be removably secured to the housing 10 adjacent the plug 22 by a plurality of spaced screws 32 and cooperating lock washers 34 and not only facilitates retaining of the plug within the bore 18, but also may function as a mounting bracket for installation of the housing 10 in the desired position with regard to a door operator, or the like (not shown). Of course, an internal shoulder or stop member (not shown) may be provided in the bore 18 for limiting the depth of insertion of the plug 22 therein and facilitate retaining of the plug 22 in the desired position.

The opposite end of the bore 18 is closed by a suitable plug 36 having a sealing ring 38 provided on the outer periphery thereof for precluding leakage of fluid therearound. The plug 36 may be disposed adjacent an internal shoulder or stop member (not shown) and retained in position by a suitable lock ring 40 as hereinbefore set forth. In adidtion, the plug 36 is provided with a central aperture 42 for receiving the piston 20 therethrough as will be hereinafter set forth, and an internally disposed sealing ring 44 is disposed within the bore 42 for precluding leakage of fluid.

A reservoir chamber 46 is provided in the enlarged portion 14 for receiving a hydraulic fluid therein and is in communication with the bore 18 through a suitable aperture 48 in order to assure an adequate supply of the hydraulic fluid is maintained in the bore 18 at all times. A suitable filler plug 50 is threadedly or otherwise secured in an aperture 52 which is in communication with the reservoir 46 to permit filling of the reservoir with the hydraulic fluid, as is well known. In addition, an access port 54 may be provided for the chamber 22 for permitting access to the chamber 22 when it is desired for any reason. Of course, a suitable access plug 56 having a sealing member 58 carried thereby may be provided for the port 54 as is well known.

A plurality of spaced bores 60 and 62 may be provided in the off-set portion 16, each bore being provided for receiving a suitable needle valve 64, or the like, therein. The bores 60 and 62 extend into communication with the bore 18 and are also in communication with the reservoir 46 through a passageway 66, as clearly shown in FIGURES 2 and 3. The needle valve 64 may be adjusted as desired for regulating the flow of fluid from the bore 18 through the passageway 66 and into the chamber 46 upon movement of the plunger 20 within the bore 18 for a purpose as will be hereinafter set forth.

The piston or plunger 20 comprises an elongated centrally disposed rod or shaft 68 which extends through the bore 42 of the plug 36, as hereinbefore set forth, and is provided with an aperture 70, or the like, at the outer extremity thereof for connection with a reciprocating or actuating member (not shown) which transmits reciprocal movement to the plunger 20 during the opening and closing of a door, or other device wherein it is desired to control the operating speed thereof. The reciprocating device may be of any suitable type, such as a rack and gear mechanism in combination with a spring member. The opposite end 72 of the rod 68 is reduced to provide an outwardly directed circumferential shoulder 74 for receiving a slidable piston head 76 thereagainst. A centrally disposed bore 78 extends longitudinally into the reduced portion 72 and into communication with a radially extending bore 80 to provide a passageway between the right hand end of the rod 68, as viewed in the drawings, and a point spaced slightly from the shoulder 74.

The piston head 76 is provided with a central bore 82 for slidably receiving the reduced portion 72 therethrough and the overall length of the head 76 is slightly less than the length of the reduced portion 72 as clearly shown in the drawings and for a purpose as will be hereinafter set forth. The bore 82 is enlarged at 84 for receiving a suitable spring 86 therein and the annular shoulder 83 formed within the bore 82 by the enlarged portion receives one end of the spring 86 thereagainst. An annular keeper plate 88 is slidably disposed on the reduced portion 72 and spaced from the shoulder 74 for cooperating with a snap lock ring 90 to retain the piston head 76 in position on the reduced portion 72. The snap ring 90 is disposed within an annular groove 92 provided in the outer periphery of the piston head 76 for receiving an O-ring 96 to preclude leakage of fluid between the bore 18 and the piston head 76 as is well known. The spring 86 bears against the keeper plate 88 and the shoulder 83 for constantly urging the piston head in a direction toward the shoulder 74.

Whereas the housing 10 and piston 20 may be constructed of any suitable material and substantially any hydraulic fluid may be used, tests have proven excellent with the housing 10 constructed of aluminum and the piston head constructed from a thermoplastic such as known by the trade name Delrin, which is an acetal resin material, and utilized in combination with a silicone fluid. The action of the piston is substantially frictionless and there is substantially no wear on the outer periphery of the piston head 76 or the inner periphery of the bore 18. In addition, it is found that excellent results are obtained either with or without the use of the O ring 96. The excellent results obtained may be due to the fact that the silicone fluid has a minimum dimension, thus permitting a design wherein a slight clearance may be provided between the piston head 76 and the bore 18 without any leakage of fluid therebetween.

Operation

When it is desired to control the speed of closing of a door or any other dampening or checking operation, the housing 10 may be suitably installed by means of the bracket 30 or any other well known manner whereby the piston 20 may be secured to a reciprocating drive member such as a rack, gear and spring device similar to that shown in the John C. Catlett Patent No. 3,087,720, issued April 30, 1963, and entitled "Automatic Door Operator." By way of example, the rack member may be pinned or otherwise secured at 70 to the rod 68 for transmitting longitudinal movement thereto upon actuation of the rack. Of course, a suitable hydraulic fluid may be injected into the chamber 46 and bore 18 for filling thereof in any well known manner.

Figure 3:
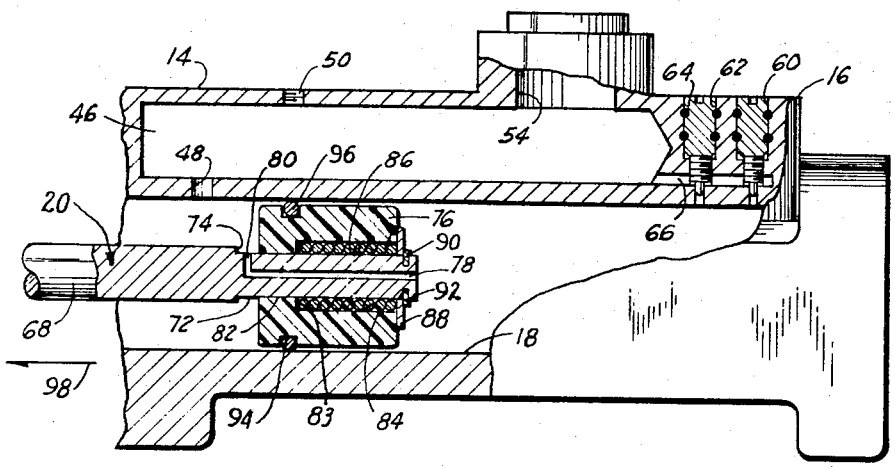
FIGURE 3 is a view similar to FIGURE 2 showing the device in a second operation position.

When the door (not shown) is being opened, the rod 68 is moved in a left hand direction as shown by the arrow 98 in FIGURE 3. The force of the fluid contained within the bore 18 and on the left side of the piston as viewed in the drawings retards the movement of the piston head 76 whereby the rod 68 moves with respect thereto. Of course, continued left hand movement of the rod 68 brings the keeper plate 88 into engagement with the head 76 and further left hand movement of the rod 98 moves the piston head 76 simultaneously therewith. In this relative position between the rod 68 and the piston head 76, the port 80 is opened whereby fluid may flow freely through the port 80 and passageway 78. Thus, substantially no restriction is made to the opening of the door.

Figure 2:
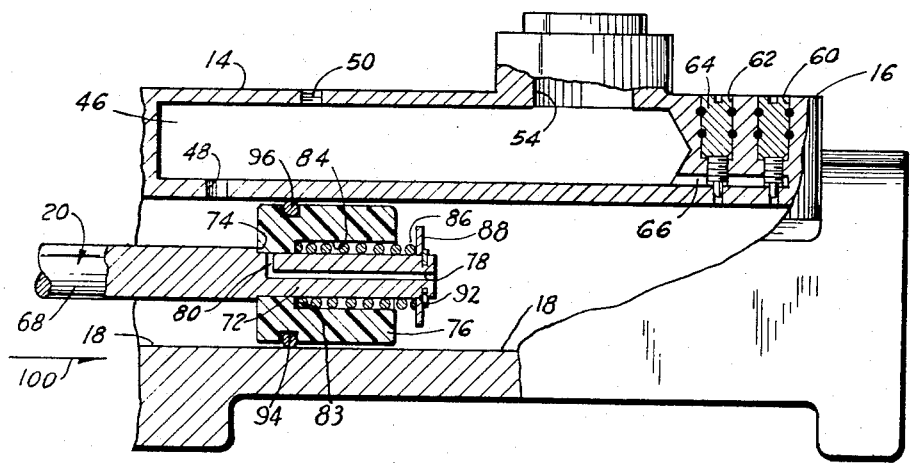
FIGURE 2 is a broken elevational view partly in section of a dampening device embodying the invention depicting the device in one operation and with portions eliminated for purposes of illustration.

Conversely, when the door is being closed, the rod 68 is moved in a right hand direction as shown by the arrow 100 in FIGURE 2 and the force of the fluid on the right hand side of the piston head 76 in combination with the force of the spring 86 maintains the piston head 76 in a position adjacent the shoulder 74 for closing the port 80. Continued right hand movement of the rod 68 moves the piston head 76 simultaneously therewith and the fluid within the bore 18 on the right hand side of the piston head 76 is forced outwardly around the needle valves 64 and into the reservoir 46. Of course, the fluid in the reservoir 46 is communicated to the left hand side of the piston head through the port 48. The needle valves 64 may be adjusted in any well known manner for regulating the rate of flow of the fluid from the bore 18 through the passageway 66 and into the chamber 46. Thus, the rate of speed of the movement of the piston 20 is regulated for controlling the closing speed of the door.

From the foregoing, it will be apparent that the present invention provides a novel dampening device having a spring urged valving mechanism for increasing the efficient operation thereof. In addition, the combination of an aluminum housing and thermoplastic piston head in combination with a silicone fluid greatly increases the overall operating efficiency and prolongs the useful life of the device.

Changes may be made in the combination and arrangement of parts as heretofore set forth in the specification and shown in the drawings, it being understood that any modification in the precise embodiment of the invention may be made within the scope of the following claims, without departing from the spirit of the invention.

What is claimed is:

1. A dampening device comprising a housing constructed of an aluminum material and having a chamber for receiving a fluid therein, a rod member extending longitudinally within the chamber and reciprocal therein, a piston head slidably disposed on the rod, said piston head being constructed from a thermoplastic material and having an outer diameter slightly less than the inner diameter of the chamber to provide a slight clearance therebetween for reducing wear on the piston head, stop means on the rod for retaining the piston head on the rod and limiting the slidable movement of the piston head on the rod, passageway means in the rod providing communication of the fluid from one side of the piston head to the opposite side thereof, spring means cooperating with the stop means and piston for constantly urging the piston in one direction for closing one end of the passageway to preclude the passage of fluid therethrough, and said spring means being yieldable upon movement of the rod in one direction for permitting the piston head to move to a position for opening of the passageway whereby fluid may flow therethrough, said fluid being a silicone fluid having a minimum dimension greater than the clearance between the piston head and chamber whereby the fluid will not leak therebetween.

2. A dampening device comprising a housing constructed of an aluminum material and having a chamber for receiving a fluid therein, a rod member extending longitudinally within the chamber and reciprocal therein, a reduced portion provided on one end of the rod and disposed within the chamber, a passageway provided in the reduced portion of the rod having one end opened at the end of the rod and the other end opened at the outer periphery of the reduced portion, a piston head slidably disposed on the reduced portion, said piston head being constructed from a thermoplastic material and of an outer diameter slightly less than the inner diameter of the chamber to provide a slight clearance therebetween for reducing wear on the piston head, stop means for retaining the piston head on the reduced portion, spring means engaging the stop means and the piston for constantly urging the piston in one direction for closing the end of the passageway which opens at the outer periphery of the reduced portion, and said spring means being yieldable upon movement of the rod in one direction for permitting the piston head to move to a position for opening of the passageway whereby fluid may flow therethrough, said fluid being a silicone fluid having a minimum dimension greater than the clearance between the piston head and chamber whereby the fluid will not leak therebetween.

3. In combination with a housing having a chamber for receiving a fluid therein, a piston comprising a central rod member extending into the chamber and reciprocal with respect thereto, a reduced neck portion provided on one end of the rod and disposed within the chamber, an annular shoulder provided on the outer periphery of the rod at the juncture between the rod and the reduced neck portion, an angled passageway extending longitudinally through the reduced neck portion having one end opened at the end of the rod and the other end opened at a point spaced slightly from the annular shoulder, a piston head slidably disposed on the reduced neck portion, an annular chamber provided in the piston head around the reduced neck portion, a stop member disposed around the reduced neck portion and spaced from the annular shoulder, spring means disposed within the annular chamber and around the reduced neck portion, said spring means bearing against the stop member for urging the piston head toward the annular shoulder whereby one end of the passageway is closed for precluding the flow of fluid therethrough, said spring being yieldable upon movement of the rod in one direction for permitting movement of the piston head along the reduced neck portion to a position opening the passageway for permitting the flow of fluid therethrough.

4. In combination with an aluminum housing having a chamber for receiving fluid therein, a piston as set forth in claim 3 wherein the piston head is constructed of a thermoplastic material and the fluid is a silicone fluid.

5. In combination with a housing constructed of aluminum and having a fluid receiving chamber therein including a bore and a fluid by-pass in communication with the opposite ends thereof, a piston comprising a central rod member extending into the bore and reciprocal with respect thereto, a reduced neck portion provided on one end of the rod and disposed within the bore, an annular shoulder provided on the outer periphery of the rod at the juncture between the rod and the reduced neck portion, an angled passageway extending longitudinally through the reduced neck portion and having one end opened at the end of the rod and the other end opened at a point spaced slightly from the annular shoulder, a piston head constructed of an acetal resin and slidably disposed on the reduced neck portion and slidable within the bore, said piston head having an outer diameter substantially equal to but slightly less than the diameter of the bore to provide a very small clearance therebetween, an annular chamber provided in the piston head around the reduced neck portion, a stop member disposed around the reduced neck portion and spaced from the annular shoulder, spring means disposed within the annular chamber and around the reduced neck portion, said spring means bearing against the stop member for urging the piston head in a direction toward the annular shoulder whereby one end of the passageway is closed for precluding the flow of fluid therethrough upon movement of the piston in one direction for forcing the fluid through the by-pass for dampening the speed of movement of the piston in said direction, said spring being yieldable upon movement of the rod in an opposite direction for permitting movement of the piston head along the reduced neck portion to a position opening the passageway for permitting the flow of fluid therethrough whereby movement of the rod within the bore will be substantially unresisted by the fluid, said fluid being a silicone fluid having a minimum dimension greater than the clearance between the piston head and bore to substantially preclude leakage of the fluid therebetween.

References Cited

UNITED STATES PATENTS

| | | | |
|---|---|---|---|
| 1,170,226 | 2/1916 | Doxey. | |
| 1,409,849 | 3/1922 | Haeberlein. | |
| 1,818,250 | 9/1931 | Harrah et al. | 16—52 |
| 2,091,904 | 9/1937 | Baumann | 16—51 |
| 2,953,810 | 9/1960 | Hall | 16—52 |
| 3,025,558 | 3/1962 | Hawks | 16—51 |
| 3,110,924 | 11/1963 | Wartian | 16—52 |
| 3,173,671 | 3/1965 | Broadwell. | |
| 3,182,349 | 5/1965 | Sogoian | 16—52 |

BOBBY R. GAY, *Primary Examiner.*